(12) United States Patent
Kobayashi et al.

(10) Patent No.: US 11,991,443 B2
(45) Date of Patent: May 21, 2024

(54) IMAGE PROCESSING DEVICE AND IMAGE PROCESSING METHOD CAPABLE OF CORRECTING DISTORTION OCCURRED IN AN IMAGE CAPTURED THROUGH A ZOOM LENS

(71) Applicant: JVCKENWOOD Corporation, Yokohama (JP)

(72) Inventors: Toshihide Kobayashi, Yokohama (JP); Masakazu Tateishi, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 68 days.

(21) Appl. No.: 17/819,375

(22) Filed: Aug. 12, 2022

(65) Prior Publication Data

US 2022/0385802 A1 Dec. 1, 2022

Related U.S. Application Data

(63) Continuation of application No. PCT/JP2020/047940, filed on Dec. 22, 2020.

(30) Foreign Application Priority Data

Feb. 14, 2020 (JP) .................... 2020-023458

(51) Int. Cl.
*H04N 23/67* (2023.01)
*H04N 23/69* (2023.01)

(52) U.S. Cl.
CPC ............. *H04N 23/67* (2023.01); *H04N 23/69* (2023.01)

(58) Field of Classification Search
CPC ........ H04N 23/67; H04N 23/69; H04N 23/12; H04N 23/81; H04N 25/61; G06T 5/20; G06T 5/006
See application file for complete search history.

(56) References Cited

U.S. PATENT DOCUMENTS

| | | | |
|---|---|---|---|
| 11,089,247 B2 * | 8/2021 | Cote | H04N 25/67 |
| 2007/0115384 A1 * | 5/2007 | Furukawa | H04N 25/611 |
| | | | 348/335 |

(Continued)

FOREIGN PATENT DOCUMENTS

JP  2015-149618 A  8/2015

OTHER PUBLICATIONS

International Search Report issued on Mar. 16, 2021 for application No. PCT/JP2020/047940.

*Primary Examiner* — Luong T Nguyen
(74) *Attorney, Agent, or Firm* — Nath, Goldberg & Meyer; Jerald L. Meyer; Ilirian Durri

(57) ABSTRACT

A first multiplier multiplies a correction value by an adjustment coefficient and generates an adjusted correction value, the correction value being read from the correction value table, and the adjustment coefficient being determined from a zoom magnification and a focus distance. A second multiplier multiplies the adjusted correction value by a cosine of an angle formed between a position of each target pixel and the center of the frame and generates a horizontal correction value that corrects the target pixel in a horizontal direction. A horizontal filter adds all multiplication results obtained by multiplying a plurality of pixels in a left-right direction with each target pixel as a center, by left-right asymmetric coefficients, generates a horizontal high-pass filter component, adds, to each target pixel, a horizontal correction component obtained by multiplying the horizontal high-pass filter component by the horizontal correction value, and corrects each target pixel in the horizontal direction.

8 Claims, 14 Drawing Sheets

(56) References Cited

U.S. PATENT DOCUMENTS

| | | | |
|---|---|---|---|
| 2008/0137980 A1* | 6/2008 | Mizuno | G06T 5/006 382/255 |
| 2016/0275656 A1* | 9/2016 | Watanabe | H04N 25/60 |
| 2017/0192229 A1* | 7/2017 | Nakamura | H04N 5/04 |

* cited by examiner

FIG. 2

| R  | G1 | R  | G1 | R  | G1 | R  | G1 |
|----|----|----|----|----|----|----|----|
| G2 | B  | G2 | B  | G2 | B  | G2 | B  |
| R  | G1 | R  | G1 | R  | G1 | R  | G1 |
| G2 | B  | G2 | B  | G2 | B  | G2 | B  |
| R  | G1 | R  | G1 | R  | G1 | R  | G1 |
| G2 | B  | G2 | B  | G2 | B  | G2 | B  |

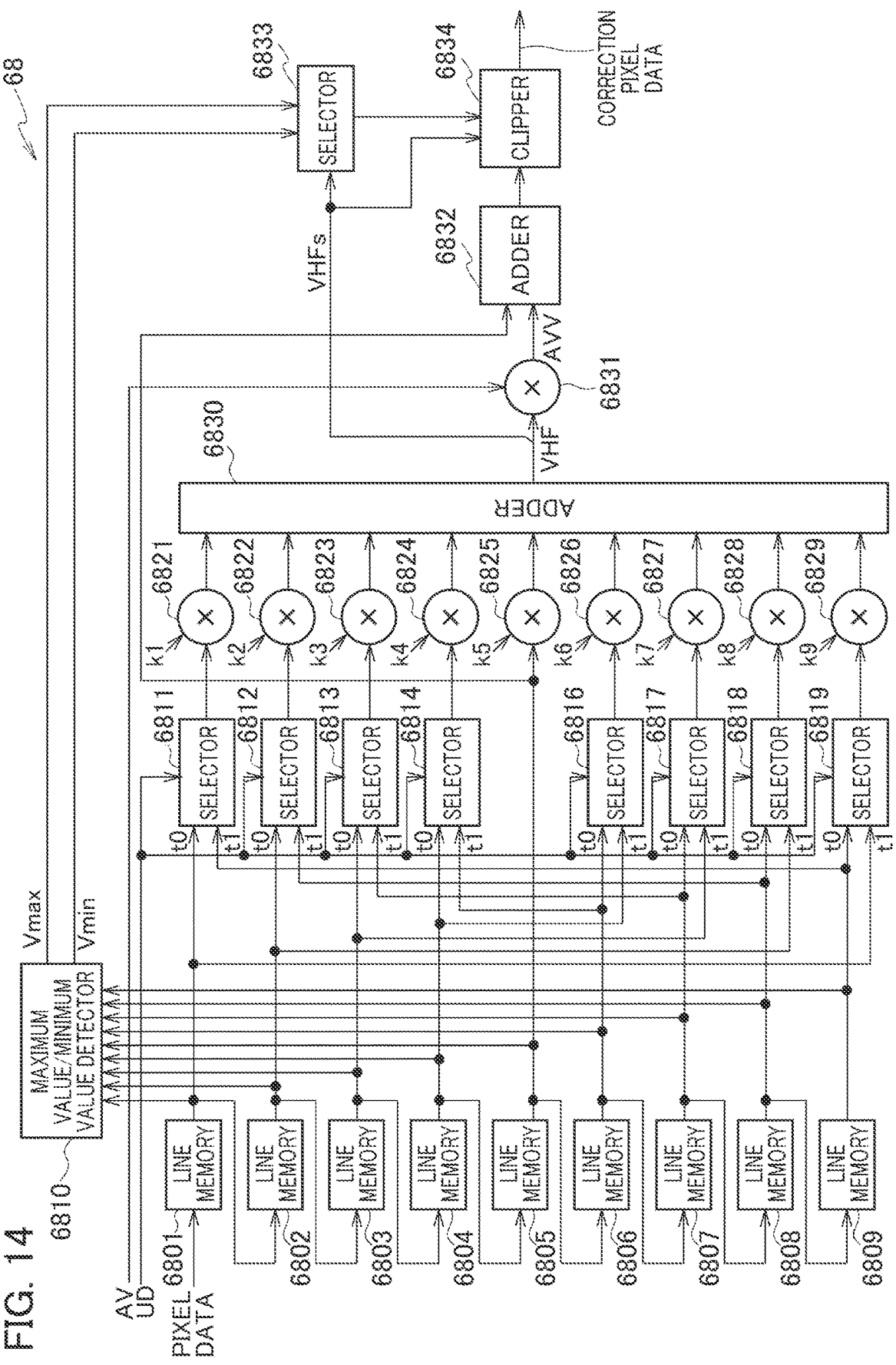

IMAGE PROCESSING DEVICE AND IMAGE PROCESSING METHOD CAPABLE OF CORRECTING DISTORTION OCCURRED IN AN IMAGE CAPTURED THROUGH A ZOOM LENS

CROSS REFERENCE TO RELATED APPLICATION

This application is a Continuation of PCT Application No. PCT/JP2020/047940, filed on Dec. 22, 2020, and claims the priority of Japanese Patent Application No. 2020-023458 filed on Feb. 14, 2020, the entire contents of both of which are incorporated herein by reference.

BACKGROUND

The present disclosure relates to an image processing device and an image processing method suitable for use in an imaging apparatus having a zoom lens.

In an imaging apparatus having a zoom lens, the distance in focus at the center of a frame and the distance in focus at ends of the frame may be slightly deviated due to the influence of the field curvature of the lens depending on the lens magnification or the focus distance. When a lens having such field curvature is used, even if focus is obtained at the center of the frame, a slight defocus occurs at the ends of the frame, and accordingly distortion occurs in the captured image.

SUMMARY

The arrival of the following is desired: an image processing device and an image processing method capable of correcting distortion occurred in an image captured through a zoom lens.

A first aspect of one or more embodiments provides an image processing device including: a correction value table in which a correction value is set, the correction value being in accordance with a distance between a center of a frame of a captured image captured through a zoom lens, and a pixel positioned in the frame; a first multiplier configured to multiply a correction value by an adjustment coefficient and to generate an adjusted correction value, the correction value being read from the correction value table in accordance with a distance between the center of the frame and each target pixel in the frame, and the adjustment coefficient being determined from at least a zoom magnification and a focus distance of the zoom lens; a second multiplier configured to multiply the adjusted correction value by a cosine of an angle formed between a position of each target pixel and the center of the frame and to generate a horizontal correction value that corrects each target pixel in a horizontal direction; and a horizontal filter configured to add all multiplication results obtained by multiplying a plurality of pixels in a left-right direction with each target pixel as a center by left-right asymmetric coefficients, to generate a horizontal high-pass filter component, to add, to each target pixel, a horizontal correction component obtained by multiplying the horizontal high-pass filter component by the horizontal correction value, and to correct each target pixel in the horizontal direction.

A second aspect of one or more embodiments provides an image processing method including: setting a correction value in a correction value table and reading the correction value from the correction value table in accordance with a distance between a center of a frame of a captured image captured through a zoom lens and each target pixel in the frame, the correction value being in accordance with a distance between the center of the frame and a pixel positioned in the frame; multiplying the read correction value by an adjustment coefficient and generating an adjusted correction value, the adjustment coefficient being determined from at least a zoom magnification and a focus distance of the zoom lens; multiplying the adjusted correction value by a cosine of an angle formed between a position of each target pixel and the center of the frame and generating a horizontal correction value that corrects each target pixel in a horizontal direction; adding all multiplication results obtained by multiplying a plurality of pixels in a left-right direction with each target pixel as a center by left-right asymmetric coefficients and generating a horizontal high-pass filter component; and adding, to each target pixel, a horizontal correction component obtained by multiplying the horizontal high-pass filter component by the horizontal correction value and correcting each target pixel in the horizontal direction.

BRIEF DESCRIPTION OF THE DRAWINGS

FIG. 2 is a partial plan view illustrating a Bayer array color filter.

FIG. 5 is a partial plan view illustrating an RGB image signal output from a demosaic circuit 7 shown in FIG. 1.

FIG. 14 is a block diagram illustrating a specific configuration example of a vertical filter 68 shown in FIG. 6.

DETAILED DESCRIPTION

Figure 1:
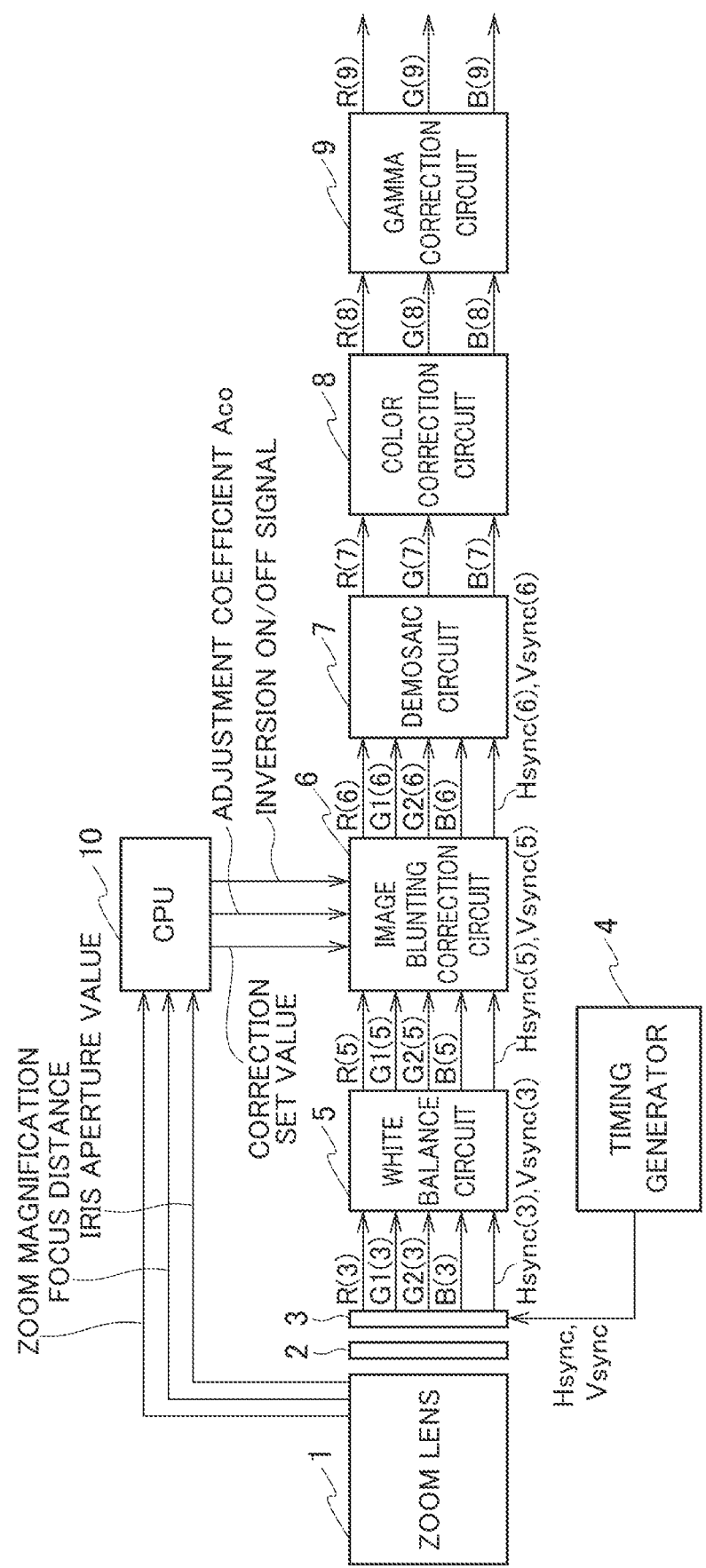
FIG. 1 is a block diagram illustrating a schematic configuration of an imaging apparatus having a zoom lens.

An image processing device and an image processing method according to one or more embodiments will be described below with reference to the accompanying drawings. First, a schematic configuration and operation of an imaging apparatus having a zoom lens will be explained with reference to FIG. 1. In FIG. 1, infrared light from a subject that has entered through a zoom lens 1 is cut by means of an infrared cut filter 2 and the visible light enters an imaging element 3. The zoom lens 1 has a plurality of lenses and an iris.

An imaging element 3 may be a complementary metal oxide semiconductor (CMOS) sensor or a charge coupled device (CCD). The imaging apparatus captures a still image or a moving image of the subject by means of the imaging element 3

The imaging element 3 includes a color filter having a Bayer array shown in FIG. 2. In the Bayer array color filter, rows in which R filters and G filters for generating red (R) and green (G) pixels are alternately arranged and rows in which B filters and G filters for generating blue (B) and green (G) pixels are alternately arranged are alternately arranged in the column direction. Rows are in the horizontal direction of the image and columns are in the vertical direction of the image. In the horizontal direction, each G filter interposed between two R filters is referred to as a G1 filter and each G filter interposed between two B filters is referred to as a G2 filter.

A timing generator 4 supplies, to the imaging element 3, a horizontal synchronization signal Hsync and a vertical synchronization signal Vsync. The imaging element 3 generates pieces of pixel data R(3), G1(3), G2(3), and B(3) which are digital color signals respectively corresponding to the R filter, G1 filter, G2 filter, and B filter. The imaging element 3 supplies, to a white balance circuit 5, the pieces of pixel data R(3), G1(3), G2(3), and B(3), a horizontal synchronization signal Hsync (3), and a vertical synchronization signal Vsync (3).

The white balance circuit 5 adjusts the white balance of the pieces of pixel data R(3), G1(3), G2(3), and B(3) by adjusting individual values of the pieces of pixel data. The white balance circuit 5 supplies, to an image blunting correction circuit 6, pieces of pixel data R(5), G1(5), G2(5), and B(5) which are obtained by adjusting white balance, a horizontal synchronization signal Hsync (5), and a vertical synchronization signal Vsync (5).

A central processing unit 10 (hereinafter referred to as a CPU 10) receives, from the zoom lens 1, a zoom magnification, a focus distance, and an iris aperture value. The CPU 10 supplies, to the image blunting correction circuit 6, a correction set value, an adjustment coefficient Aco, and an inversion on/off signal which will be described later.

Figure 3:
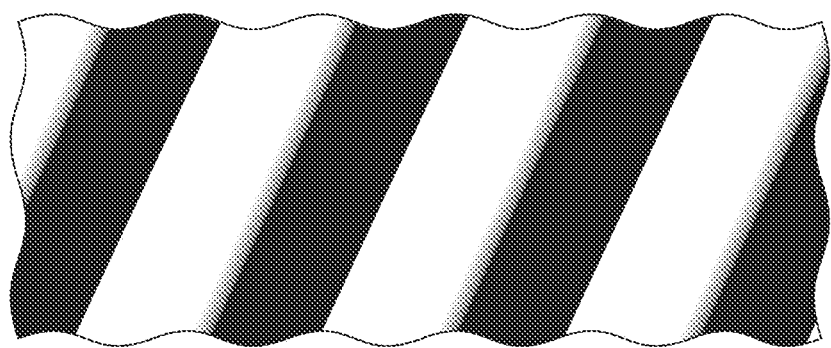
FIG. 3 is a diagram illustrating a first example of blurring occurring in an image captured by an imaging apparatus.

A schematic operation of the image blunting correction circuit 6 will be described with reference to FIGS. 3 and 4. Suppose that the image captured by the imaging apparatus is an image in which black portions and white portions are alternately repeated as shown in FIG. 3. In the above case, the image signal is essentially a rectangular wave signal in which black levels and white levels are alternately repeated in the horizontal and vertical directions. However, when focus is obtained at the center of the frame, a slight defocus occurs at the ends due to the influence of the field curvature of the lens in the zoom lens 1, and accordingly, distortion occurs in the captured image.

Figure 4:
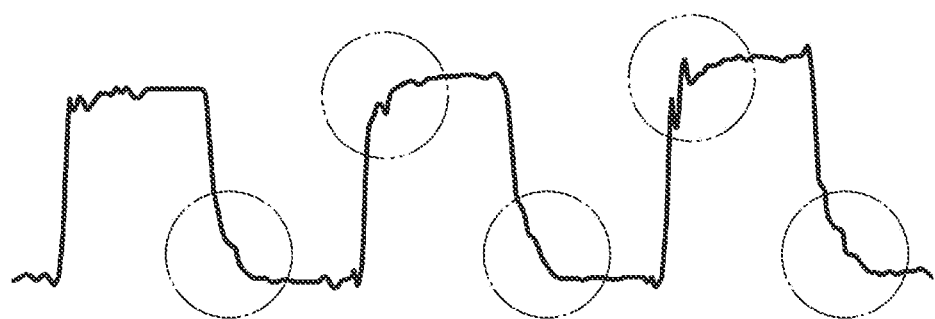
FIG. 4 is a waveform diagram illustrating a rectangular wave signal having a blunted waveform when blurring occurs in the captured image shown in FIG. 3.

As shown in FIG. 4, the rectangular wave signal has an irregular waveform. The waveform blunts to a large extent in the vicinity of each black portion of each boundary portion at which there is a change from a white portion to a black portion in the horizontal direction or in the vertical direction as indicated by the portions surrounded by circles of dash-dot-dash lines. However, the waveform does not blunt that much in the vicinity of each black portion of each boundary portion at which there is a change from a black portion to a white portion in the horizontal direction or the vertical direction. In addition, as shown by the portions surrounded by circles of dash-dot-dot-dash lines, the waveform may be blunted in the vicinity of each white portion of each boundary portion at which there is a change from a black portion to a white portion. As a result, as shown in FIG. 3, blurring occurs in the vicinity of each black portion of a boundary at which there is a change from a white portion to a black portion in the horizontal or vertical direction. A slight blurring occurs also in the vicinity of each white portion of each boundary portion at which there is a change from a black portion to a white portion. Therefore, the boundaries are not clear. The degree of distortion of the rectangular wave signal differs depending on the position in the frame, and the degree of blunting of the waveform is not constant either.

The image blunting correction circuit 6 corrects the blunting of the waveform shown in FIG. 4 in the pieces of pixel data R(3), G1(3), G2(3), and B(3). The image blunting correction circuit 6 supplies, to a demosaic circuit 7, pieces of pixel data R(6), G1(6), G2(6), and B(6) obtained by correcting the blunting of the waveform, a horizontal synchronization signal Hsync (6), and a vertical synchronization signal Vsync (6). The specific configuration and operation of the image blunting correction circuit 6 will be described later in detail.

Figure 5:
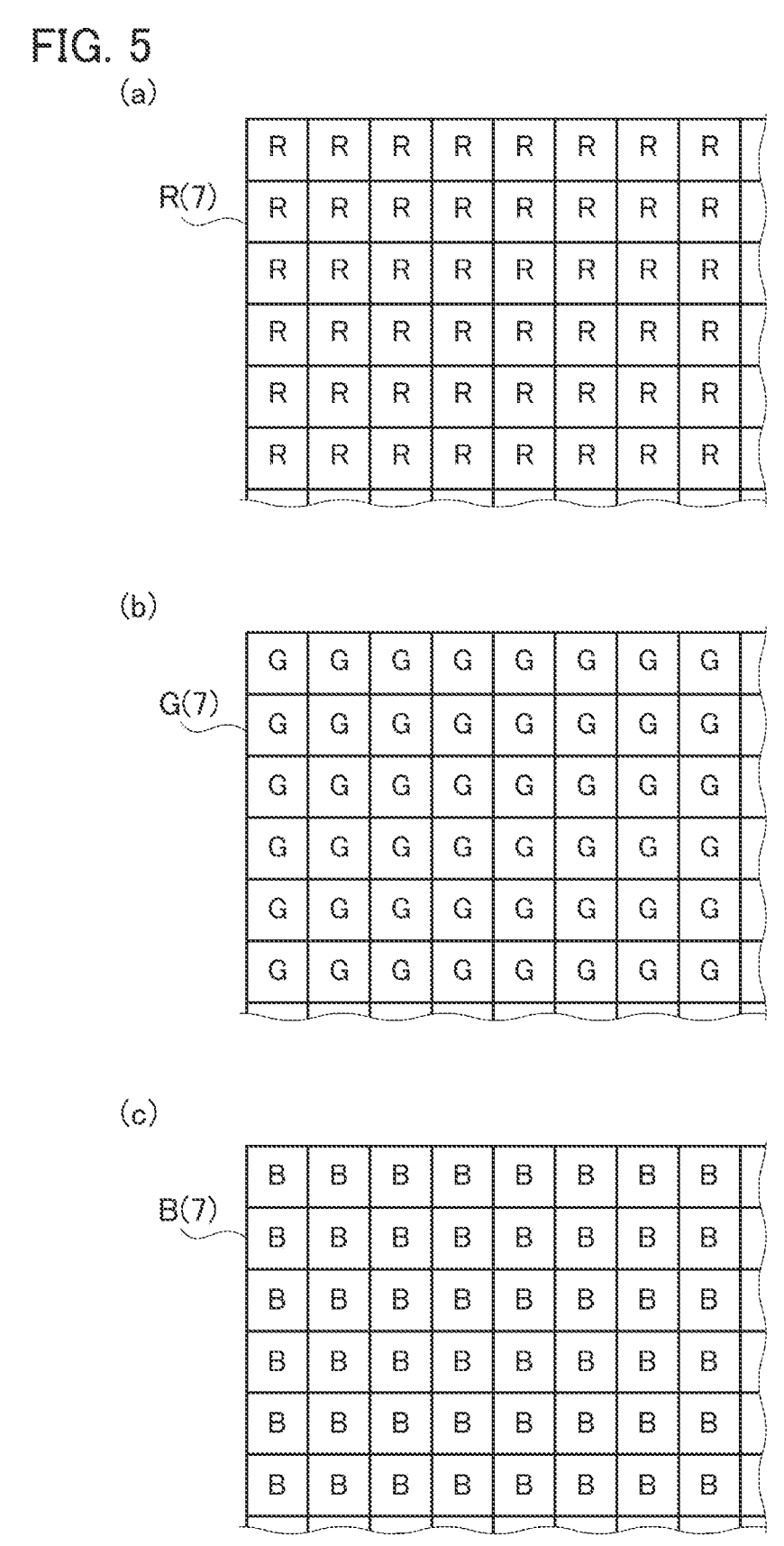

The demosaic circuit 7 receives an image signal in which pieces of pixel data R(6), G1(6), G2(6), and B(6) are mixed in a frame. The demosaic circuit 7 interpolates R pixel data to pixel positions at which R pixel data is not present, and generates an R image signal R(7) shown in FIG. 5(a) in which all the pixels in the frame are R pixel data. The demosaic circuit 7 interpolates G pixel data to pixel positions at which G pixel data is not present, and generates a G image signal G(7) shown in FIG. 5(b) in which all the pixels in the frame are G pixel data. The demosaic circuit 7 interpolates B pixel data to pixel positions at which B pixel data is not present, and generates an image signal B(7) shown in FIG. 5(c) in which all the pixels in the frame are B pixel data.

A color correction circuit 8 corrects the colors of the R image signal R(7), the G image signal G(7), and the B image signal B(7) to generate an R image signal R(8), a G image signal G(8), and a B image signal B(8). A gamma correction circuit 9 performs gamma correction on the R image signal R(8), the G image signal G(8), and the B image signal B(8) and outputs the signals as an R image signal R(9), a G image signal G(9), and a B image signal B(9). The R image signal R(9), the G image signal G(9), and the B image signal B(9) may be converted into luminance and color difference signals by means of an unillustrated conversion circuit and output, may be displayed on an unillustrated display, or may be recorded in an unillustrated recording unit.

Figure 6:
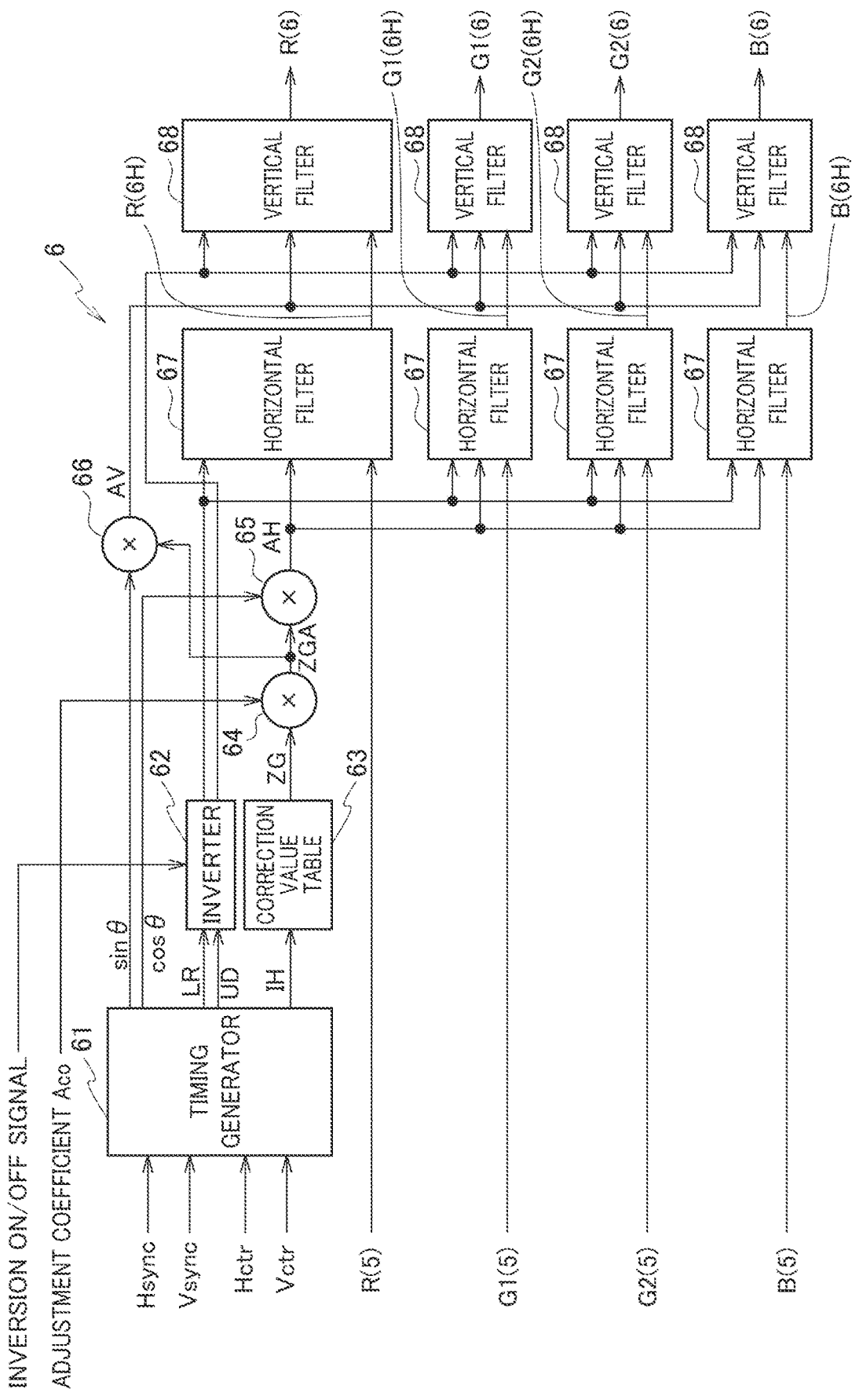
FIG. 6 is a block diagram illustrating a specific configuration example of an image blunting correction circuit 6 shown in FIG. 1, which is an image processing device according to one or more embodiments.

FIG. 6 shows a specific configuration example of the image blunting correction circuit 6. As shown in FIG. 6, the image blunting correction circuit 6 includes a timing generator 61, an inverter 62, a correction value table 63, multipliers 64 to 66, four horizontal filters 67, and four vertical filters 68.

Figure 7:
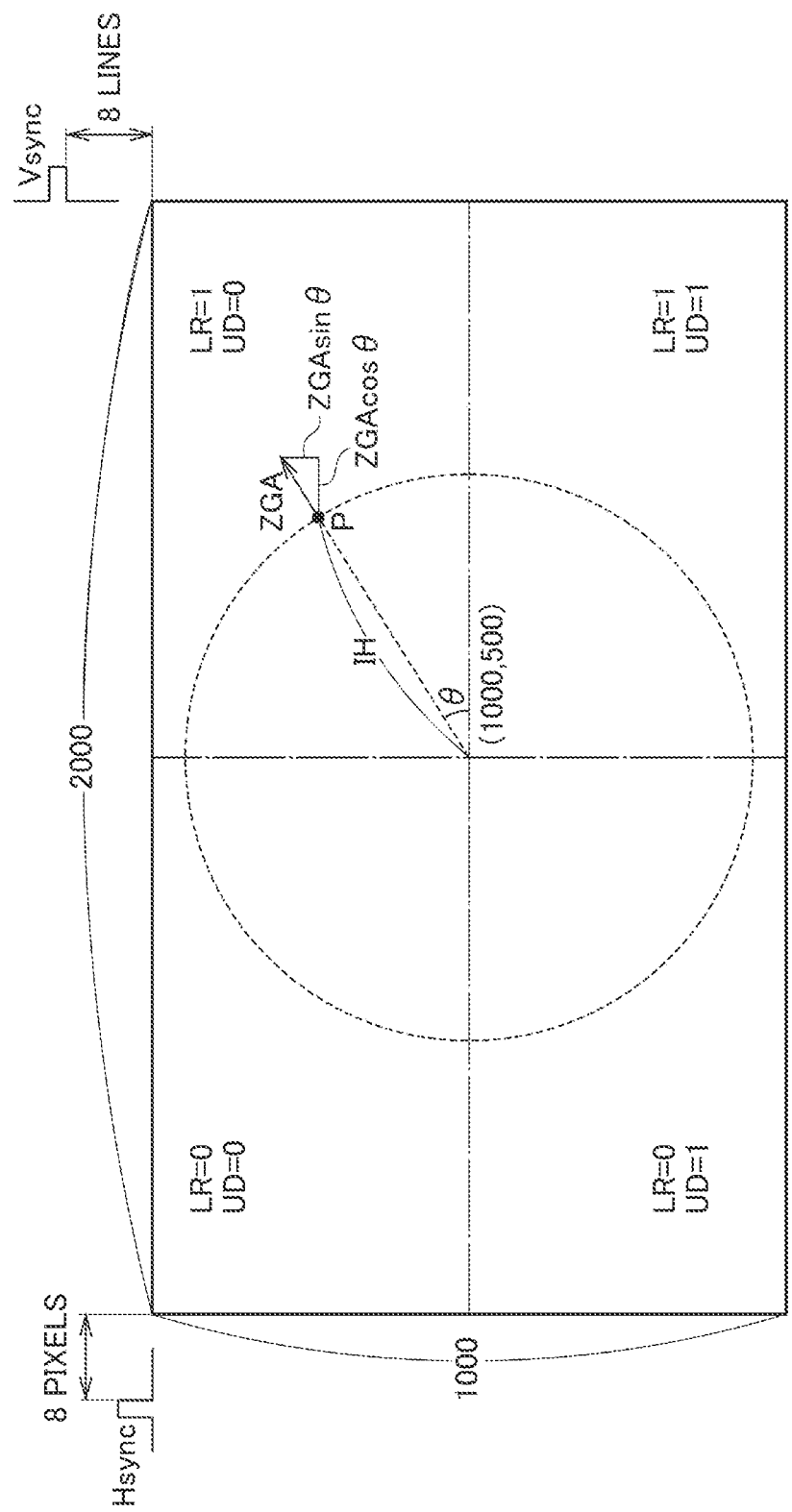
FIG. 7 is a diagram for explaining an operation of correcting one target pixel in a frame of a captured image.

The timing generator 61 receives the horizontal synchronization signal Hsync, the vertical synchronization signal Vsync, a horizontal center value Hctr, and a vertical center value Vctr as correction set values. The horizontal center value Hctr is the center in the horizontal direction of the frame (horizontal center). The vertical center value Vctr is the center in the vertical direction of the frame (vertical center). As shown in FIG. 7, suppose that the frame has 2000 pixels in the horizontal direction and 1000 lines in the vertical direction, for example. In the above case, the timing generator 61 receives 1000 as the horizontal center value Hctr and 500 as the vertical center value Vctr.

Suppose that the number of pixels in the horizontal direction and the number of lines in the vertical direction of the frame are an even number. In the above case, strictly there are no horizontal center pixels and vertical center pixels. However, pixels closest to the horizontal center and the vertical center may be set as pixels of the horizontal center value Hctr and the vertical center value Vctr.

When the imaging apparatus includes a camera shake correction function, it is preferable to shift the horizontal center value Hctr and the vertical center value Vctr in accordance with the camera shake correction. Even if the correction is either an optical camera shake correction or an electronic camera shake correction, the horizontal center value Hctr and the vertical center value Vctr are preferably shifted in correspondence with the shift amount by which the angle of view for capturing an image is shifted for camera shake correction.

In the example shown in FIG. 7, the ninth pixel from the horizontal synchronization signal Hsync is the starting position of pixels in the horizontal direction of the effective image area. The ninth line from the vertical synchronization signal Vsync is the starting position of pixels in the vertical direction of the effective image area. As shown in FIG. 7, the left side of the frame relative to the horizontal center value Hctr is LR=0 and the right side is LR=1. The upper side relative to the vertical center value Vctr is UD=0 and the lower side is UD=1. The LR value is a left/right differentiation value and the UD value is an up/down differentiation value. The LR value of the pixel of the horizontal center value Hctr may be 0 or 1. The UD value of the pixel of the vertical center value Vctr may be 0 or 1.

The timing generator 61 generates LR values and UD values corresponding to individual pixel positions of the pieces of pixel data R(5), G1(5), G2(5), and B(5) input to the horizontal filters 67 and supplies the values to the inverter 62. An inversion on/off signal is input to the inverter 62. Suppose that the inverter 62 receives 0 indicating "inversion off" as the inversion on/off signal. In the above case, the inverter 62 supplies the input LR values to the four horizontal filters 67 without inverting them and supplies the input UD values to the four vertical filters 68 without inverting them.

Suppose that the inverter 62 receives 1 indicating "inversion on" as the inversion on/off signal. In the above case, the inverter 62 inverts the input LR values and supplies them to the four horizontal filters 67. Further, the inverter 62 inverts the input UD values and supplies them to the four vertical filters 68. The significance of the inversion on/off signal and the operation of the inverter 62 will be described later. A value 1 of the inversion on/off signal is an instruction signal for instructing the inversion of the LR values.

The timing generator 61 generates an image height IH corresponding to individual pixel positions of the pieces of pixel data R(5), G1(5), G2(5), and B(5) input to the horizontal filters 67, and supplies the generated image height IH to the correction value table 63. As an example, suppose that a target pixel P to be corrected is positioned at the pixel position shown in FIG. 7. In the above case, the distance from the center of the frame that is the horizontal center value Hctr and the vertical center value Vctr to the pixel P is the image height IH.

Figure 8:
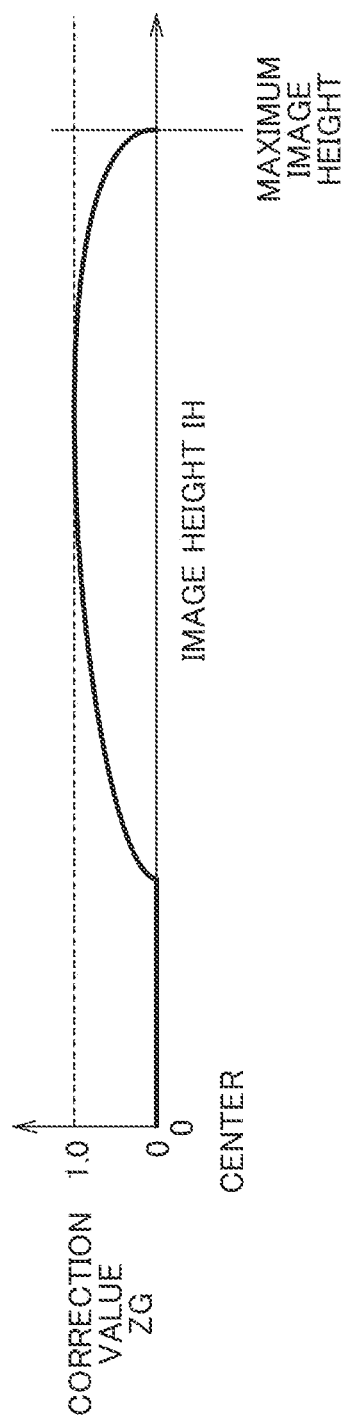
FIG. 8 is a characteristic diagram illustrating correction values according to the image height set in a correction value table 63 shown in FIG. 6.

In the correction value table 63, a correction value ZG corresponding to the image height IH and having the characteristics shown in FIG. 8 is set as an example. The correction value ZG is 0 from the center of the frame at which the image height IH is 0 to the predetermined image height IH. After exceeding the predetermined image height IH, the correction value ZG gradually increases to a maximum value of 1.0 by forming an upwardly convex curved shape. After the correction value reaches the maximum value of 1.0, the correction value gradually decreases by forming an upwardly convex curved shape until the maximum image height is reached.

The correction value ZG may have the characteristic of correcting the distortion of the image due to the influence of the field curvature of the lens according to the image height IH. The characteristic of the correction value ZG may be set depending on the lens used in the imaging apparatus and is not limited to the characteristic shown in FIG. 8. Generally, it is not necessary to perform the correction at the center of the frame. Therefore, the correction value ZG may be 0 from the center of the frame to the predetermined image height IH. After the predetermined image height IH is exceeded, the correction value ZG in accordance with the image height IH may be set.

Figure 9:
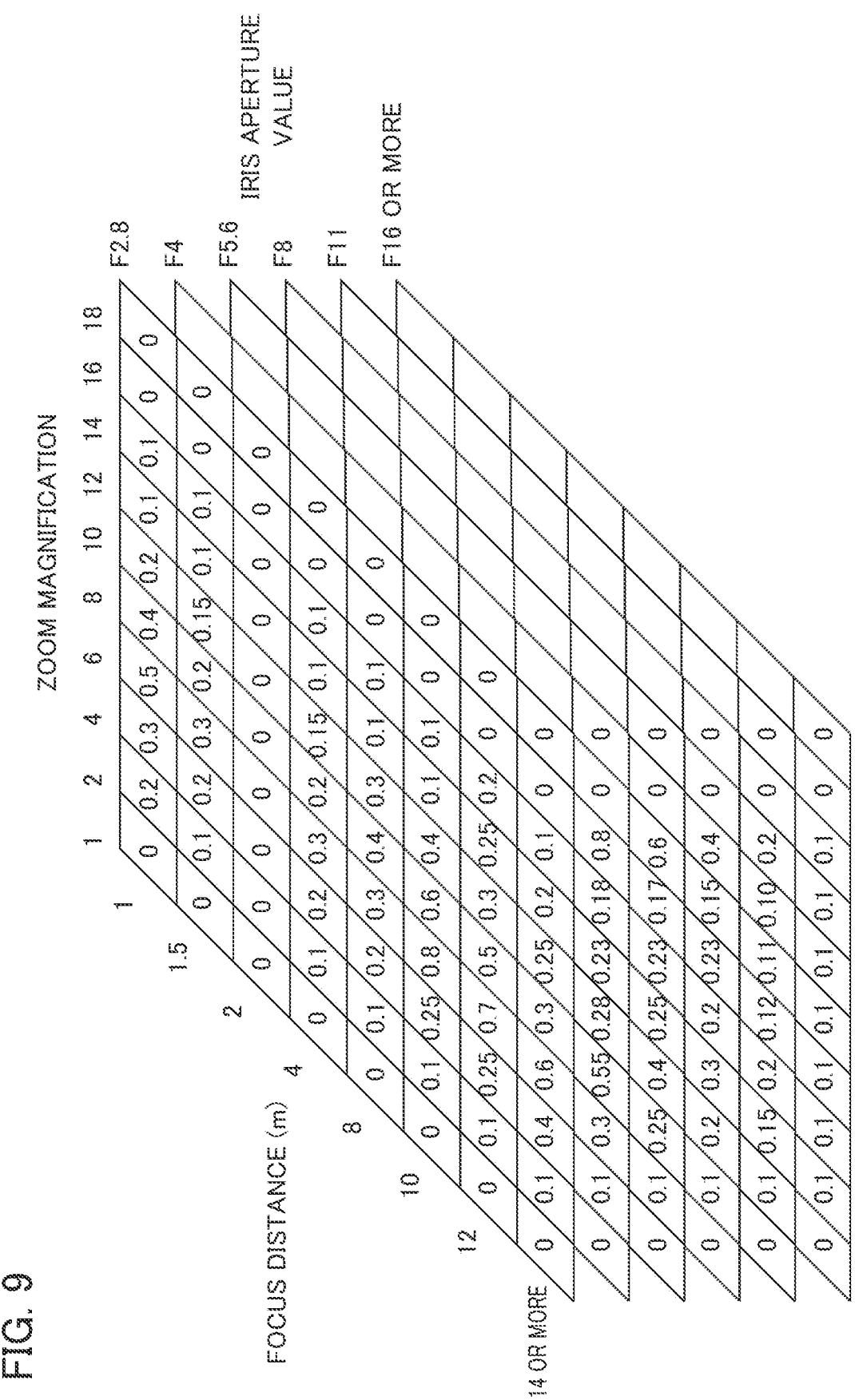
FIG. 9 is a diagram illustrating adjustment coefficients to be multiplied by the correction values shown in FIG. 8, the adjustment coefficients corresponding to a zoom magnification and a focus distance and being set for each iris aperture value.

The correction value table 63 reads the correction value ZG corresponding to the image height IH of each target pixel and supplies the value to a multiplier 64 (a first multiplier). As shown in FIG. 9, the CPU 10 supplies, to the multiplier 64, an adjustment coefficient Aco of less than 1, which is determined from the zoom magnification and the focus distance. An adjustment coefficient Aco corresponding to the zoom magnification and the focus distance is preferably set for each iris aperture value. In the example shown in FIG. 9, adjustment coefficients Aco corresponding to the zoom magnification and the focus distance are set with the iris aperture values being divided into categories of F2.8, F4, F5.6, F8, F11, and F16 or more.

It is sufficient if an adjustment coefficient Aco is set by the CPU 10, by which the distortion of the image due to the influence of the field curvature of the lens can be appropriately corrected and which is in accordance with the zoom magnification and the focus distance (preferably, the zoom magnification, the focus distance, and the iris aperture value). A specific adjustment coefficient Aco may be set depending on the lens used in the imaging apparatus and is not limited to the values shown in FIG. 9.

In the lens used in one or more embodiments, there is little distortion at a focus distance of 2 m and zoom magnifications of 1× and 18×. Therefore, the adjustment coefficient Aco is set to 0 in order to set the correction value ZG to 0.

The multiplier 64 multiplies the received correction value ZG by the adjustment coefficient Aco which is supplied from the CPU 10 and is determined according to the zoom magnification, the focus distance, and the iris aperture value. Accordingly, an adjusted correction value ZGA is generated. The adjusted correction value ZGA is supplied to the multipliers 65 and 66.

The timing generator 61 supplies a value of cos θ (cosine) to a multiplier 65 (a second multiplier). The value of cos θ corresponds to an angle θ formed between the position of each target pixel and the center of the frame. The timing generator 61 supplies a value of sin θ (sine) to a multiplier 66 (a third multiplier). As shown in FIG. 7, by multiplying the adjusted correction value ZGA by the value of cos θ, it is possible to obtain the horizontal component of the adjusted correction value ZGA for correcting the target pixel P. Further, by multiplying the adjusted correction value ZGA by the value of sin θ, it is possible to obtain the vertical component of the adjusted correction value ZGA for correcting the target pixel P. The multiplier 65 supplies, to the four horizontal filters 67, the horizontal correction value AH obtained by multiplying the adjusted correction value ZGA by the value of cos θ. The multiplier 66 supplies, to the four vertical filters 68, the vertical correction value AV obtained by multiplying the adjusted correction value ZGA by the value of sin θ.

Figure 10:
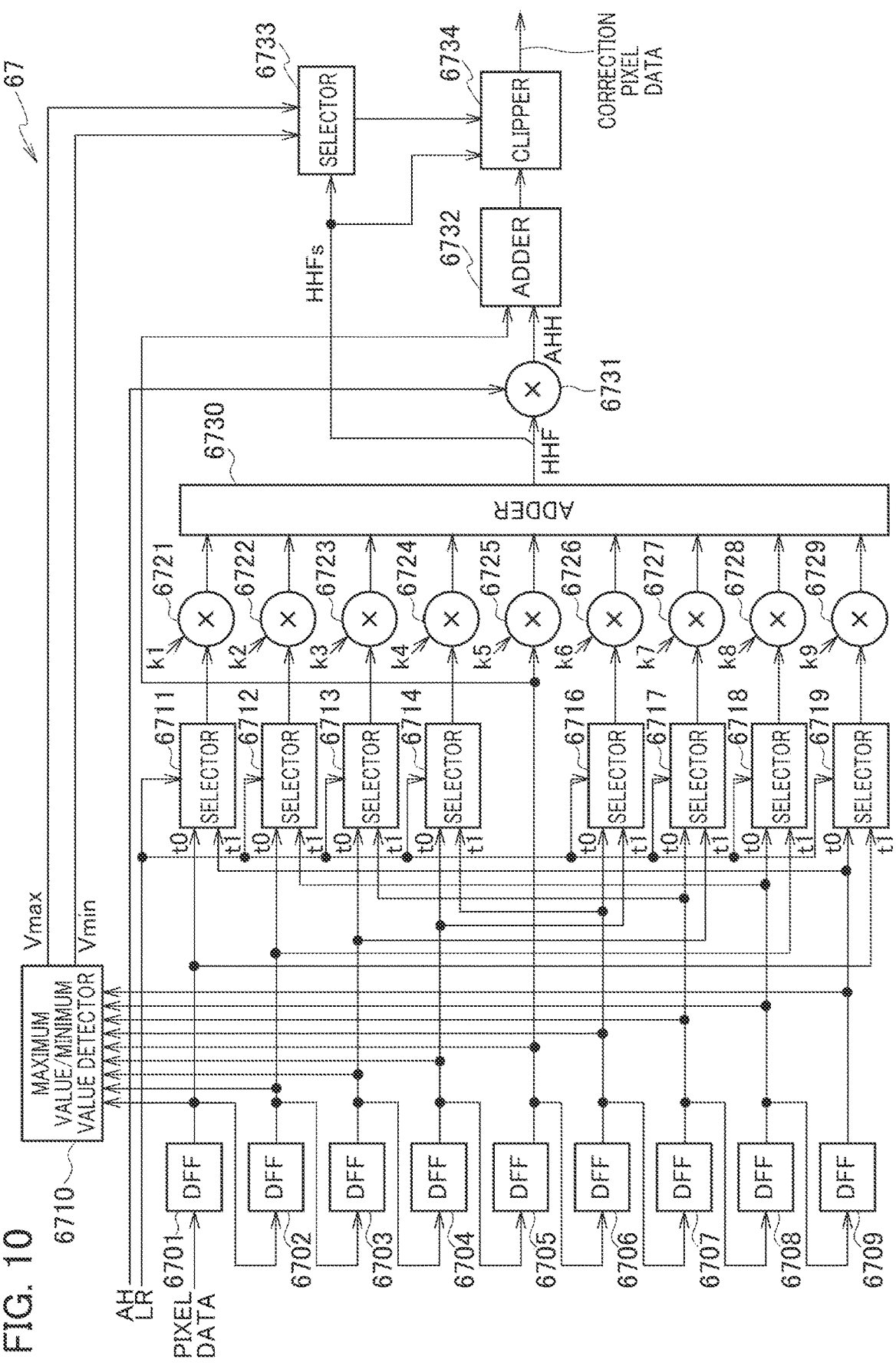
FIG. 10 is a block diagram illustrating a specific configuration example of horizontal filters 67 shown in FIG. 6.

FIG. 10 shows a specific configuration example of a horizontal filter 67. The horizontal filter 67 includes D flip-flops 6701 to 6709 configuring a shift register, a maximum value/minimum value detector 6710, selectors 6711 to 6714 and 6716 to 6719, multipliers 6721 to 6729, an adder 6730, a multiplier 6731, an adder 6732, a selector 6733, and a clipper 6734.

Each of the D flip-flops 6701 to 6709 connected in series sequentially delays input pixel data of a target pixel by one pixel period.

The pixel data output from the D flip-flop 6701 is supplied to the terminal t0 of the selector 6711 and the terminal t1 of the selector 6719. The pixel data output from the D flip-flop 6702 is supplied to the terminal t0 of the selector 6712 and the terminal t1 of the selector 6718.

The pixel data output from the D flip-flop 6703 is supplied to a terminal t0 of the selector 6713 and a terminal t1 of the selector 6717. The pixel data output from the D flip-flop 6704 is supplied to a terminal t0 of the selector 6714 and a terminal t1 of the selector 6716. The pixel data output from the D flip-flop 6705 is supplied to the multiplier 6725. The pixel data output from the D flip-flop 6705 is pixel data of a target pixel of which the distortion is actually corrected.

The pixel data output from the D flip-flop 6706 is supplied to a terminal t0 of the selector 6716 and a terminal t1 of the selector 6714. The pixel data output from the D flip-flop 6707 is supplied to a terminal t0 of the selector 6717 and a terminal t1 of the selector 6713. The pixel data output from the D flip-flop 6708 is supplied to a terminal t0 of the selector 6718 and a terminal t1 of the selector 6712. The pixel data output from the D flip-flop 6709 is supplied to a terminal t0 of the selector 6719 and a terminal t1 of the selector 6711.

The LR values are input to the selectors 6711 to 6714 and 6716 to 6719. Suppose that the LR value is 0, that is, a target pixel is located on the left side of the horizontal center of the frame. In the above case, the selectors 6711 to 6714 and 6716 to 6719 select the pixel data input to the terminal t0. Suppose that the LR value is 1, that is, a target pixel is located on the right side of the horizontal center of the frame. In the above case, the selectors 6711 to 6714 and 6716 to 6719 select the pixel data input to the terminal t1. The pieces of pixel data selected by the selectors 6711 to 6714 and 6716 to 6719 are individually supplied to the multipliers 6721 to 6724 and 6726 to 6729.

Figure 11:
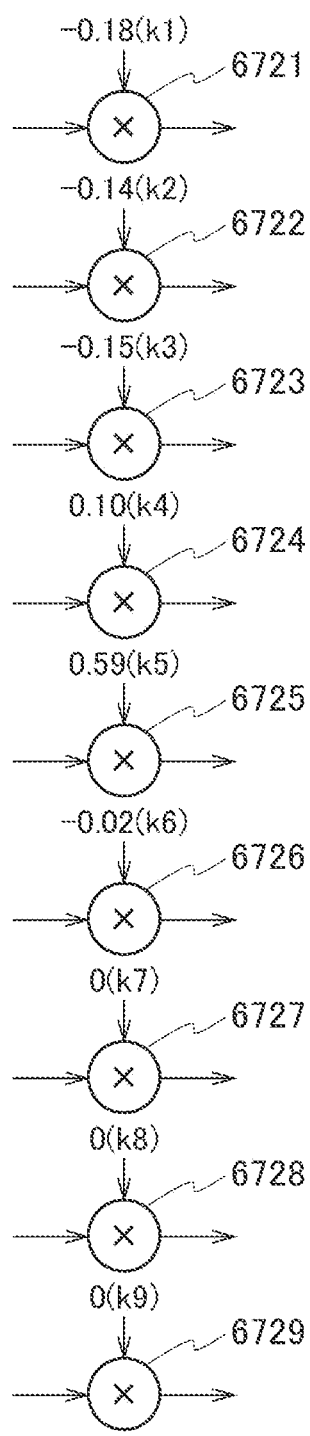
FIG. 11 is a diagram illustrating an example of coefficient values of coefficients k1 to k9 by which pixel data is multiplied by multipliers 6721 to 6729 shown in FIG. 10.

As shown in FIG. 11, the multipliers 6721 to 6729 multiply the input pixel data by −0.18, −0.14, −0.15, 0.10, 0.59, −0.02, 0, 0, and 0 as coefficients k1 to k9 respectively and output the resulting values. The coefficient values of the coefficients k1 to k9 are an example. The coefficients k1 to k9 shown in FIG. 11 are coefficient values suitable for correcting pixels located on the left side of the horizontal center of the frame and are asymmetrical in the left-right direction with the target pixel as a center.

As described above, suppose that a target pixel is located on the left side of the horizontal center of the frame. In the above case, if the selectors 6711 to 6714 and 6716 to 6719 select the pixel data input to the terminal t0, the multipliers 6721 to 6729 can directly multiply 9 pixels in the left-right direction with each target pixel as the center, by the coefficients k1 to k9 of the coefficient values shown in FIG. 11.

The distortion occurring on the left side and the distortion occurring on the right side of the horizontal center of the frame are symmetrical. Therefore, coefficient values suitable for correcting pixels located on the right side of the horizontal center of the frame may be obtained by inverting the coefficients k1 to k9 shown in FIG. 11 in the horizontal direction. As described above, suppose that a target pixel is located on the right side of the horizontal center of the frame. In the above case, if the selectors 6711 to 6714 and 6716 to 6719 select the pixel data input to the terminal t1, the multipliers 6721 to 6729 can invert the coefficients k1 to k9 shown in FIG. 11 in the horizontal direction to multiply 9 pixels in the left-right direction with each target pixel as the center, by the thus obtained coefficients.

The adder 6730 adds all the multiplication results output by the multipliers 6721 to 6729 and generates a horizontal high-pass filter component HHF. The high-pass filter component HHF is an AC component and has a positive or negative value. The multiplier 6731 multiplies the high-pass filter component HHF by the horizontal correction value AH and generates a horizontal correction component AHH. The adder 6732 adds the horizontal correction component AHH to the pixel data of the target pixel output from the D flip-flop 6705 and corrects the pixel data of the target pixel in the horizontal direction.

The maximum value/minimum value detector 6710 detects the maximum value Vmax and the minimum value Vmin of the pieces of pixel data output from the D flip-flops 6701 to 6709 and supplies the values to the selector 6733. A symbol HHFs indicating whether the high-pass filter component HHF is positive or negative is supplied to the selector 6733 and the clipper 6734. The symbol HHFs is 0 when the high-pass filter component HHF is positive and is 1 when the high-pass filter component HHF is negative. The selector 6733 selects and outputs the maximum value Vmax when the symbol HHFs is 0 and selects and outputs the minimum value Vmin when the symbol HHFs is 1.

The clipper 6734 does not operate under the following conditions: if the pixel data output from the adder 6732 is not over-corrected, and the symbol HHFs is 0 and the corrected pixel value does not exceed the maximum value Vmax, or the symbol HHFs is 1 and the corrected pixel value is not less than the minimum value Vmin. The clipper 6734 outputs the pixel data output from the adder 6732 without any changes as correction pixel data.

Figure 12:
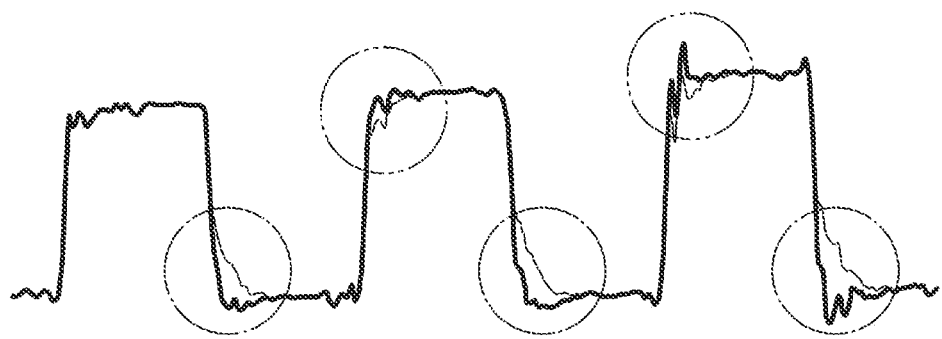
FIG. 12 is a waveform diagram illustrating a rectangular wave signal obtained by an image blunting correction circuit 6 correcting a rectangular wave signal having the blunted waveform shown in FIG. 4.

FIG. 12 shows a rectangular wave signal obtained by a horizontal filter 67 correcting a rectangular wave signal which is blunted in the vicinity of black portions of boundary portions at which there is a change from a white portion to a black portion in the horizontal direction. The waveform in the vicinity of black portions of boundary portions at which there is a change from a white portion to a black portion in the horizontal direction, surrounded by circles of dash-dot-dash lines, is corrected from the waveform before correction indicated by thin solid lines to the waveform indicated by thick solid lines. The non-blunted waveform in the vicinity of black portions of boundary portions at which there is a change from a black portion to a white portion is not corrected, and the original waveform is maintained. Accordingly, blurring caused in the vicinity of black portions of boundaries at which there is a change from a white portion to a black portion in the horizontal direction is eliminated and the boundaries become clear.

Further, FIG. 12 shows a rectangular wave signal obtained by a horizontal filter 67 correcting a rectangular wave signal which is blunted in the vicinity of white portions of boundary portions at which there is a change from a black portion to a white portion in the horizontal direction. The waveform in the vicinity of white portions of boundary portions at which there is a change from a black portion to a white portion in the horizontal direction, surrounded by circles of dash-dot-dot-dash lines, is corrected from the waveform before correction indicated by thin solid lines to the waveform indicated by thick solid lines. The non-blunted waveform in the vicinity of white portions of boundary portions at which there is a change from a white portion to a black portion is not corrected, and the original waveform is maintained. Accordingly, blurring caused in the vicinity of white portions of boundaries at which there is a change from a black portion to a white portion in the horizontal direction is eliminated and the boundaries become clear.

As described above, if it is assumed that focus is obtained at the center of the frame, the image blunting correction circuit 6 can correct the image distortion caused at the ends. However, if focus is obtained at the ends of the frame by means of manual focusing, for example, distortion occurring at the ends is reduced and the correction performed by the horizontal filter 67 may become over-correction.

Figure 13A:
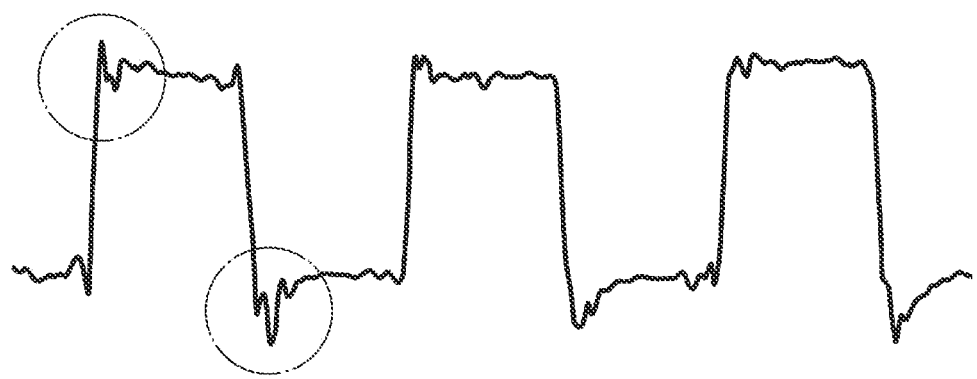
FIG. 13A is a waveform diagram illustrating a rectangular wave signal in which ringing is generated due to overcorrection of a rectangular wave signal having the blunted waveform shown in FIG. 4 by an image blunting correction circuit 6.

Specifically, the pixel data output from the adder 6732 is over-corrected, the corrected pixel value may exceed the maximum value Vmax or fall below the minimum value Vmin, and ringing may occur as indicated by circles of dash-dot-dash lines shown in FIG. 13A.

When the symbol HHFs is 0 and the corrected pixel value exceeds the maximum value Vmax, the clipper 6734 clips the pixel data output from the adder 6732 with the maximum value Vmax supplied from the selector 6733. Alternatively, when the symbol HHFs is 1 and the corrected pixel value falls below the minimum value Vmin, the clipper 6734 clips the pixel data output from the adder 6732 with the minimum value Vmin supplied from the selector 6733.

Figure 13B:
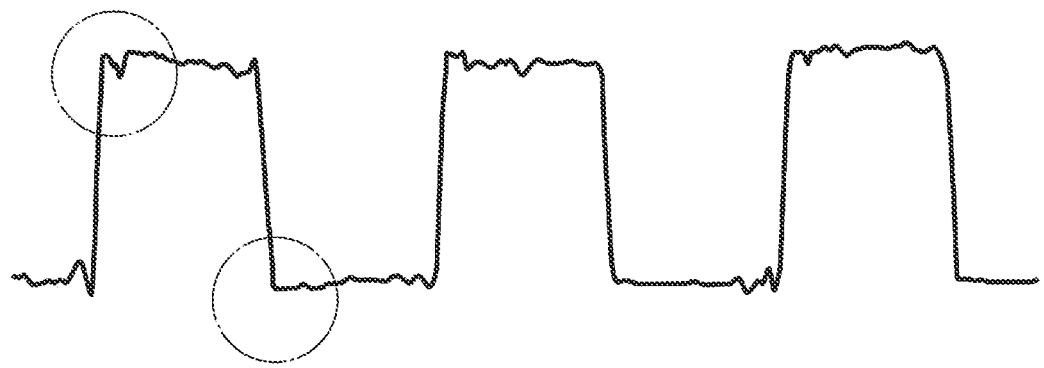
FIG. 13B is a waveform diagram illustrating a rectangular wave signal obtained by removing ringing.

As a result, the clipper 6734 outputs horizontal correction pixel data obtained by removing the ringing added to the pixel data output from the adder 6732 as shown by the circles of dash-dot-dash lines shown in FIG. 13B.

The pieces of pixel data R(6H), G1(6H), G2(6H), and B(6H) which are corrected in the horizontal direction by means of the four horizontal filters 67 are input to the four vertical filters 68 respectively as shown in FIG. 6, and are also corrected in the vertical direction.

FIG. 14 shows a specific configuration example of a vertical filter 68. The vertical filter 68 includes line memories 6801 to 6809, a maximum value/minimum value detector 6810, selectors 6811 to 6814 and 6816 to 6819, multipliers 6821 to 6829, an adder 6830, a multiplier 6831, an adder 6832, a selector 6833, and a clipper 6834.

Each of the line memories 6801 to 6809 connected in series sequentially delays input pixel data by one horizontal period. The pixel data output from the line memory 6801 is supplied to a terminal t0 of the selector 6811 and a terminal t1 of the selector 6819. The pixel data output from the line memory 6802 is supplied to a terminal t0 of the selector 6812 and a terminal t1 of the selector 6818.

The pixel data output from the line memory 6803 is supplied to a terminal t0 of the selector 6813 and a terminal t1 of the selector 6817. The pixel data output from the line memory 6804 is supplied to a terminal t0 of the selector 6814 and a terminal t1 of the selector 6816. The pixel data output from the line memory 6805 is supplied to the multiplier 6825. The pixel data output from the line memory 6805 is pixel data of a target pixel of which the distortion is actually corrected.

The pixel data output from the line memory 6806 is supplied to a terminal t0 of the selector 6816 and a terminal t1 of the selector 6814. The pixel data output from the line memory 6807 is supplied to a terminal t0 of the selector 6817 and a terminal t1 of the selector 6813. The pixel data output from the line memory 6808 is supplied to a terminal t0 of the selector 6818 and a terminal t1 of the selector 6812. The pixel data output from the line memory 6809 is supplied to a terminal t0 of the selector 6819 and a terminal t1 of the selector 6811.

The UD values are input to the selectors 6811 to 6814 and 6816 to 6819. The selectors 6811 to 6814 and 6816 to 6819 select the pixel data input to the terminal t0 when the UD value is 0, that is, when the target pixel is located on the upper side of the vertical center of the frame. The selectors 6811 to 6814 and 6816 to 6819 select the pixel data input to the terminal t1 when the UD value is 1, that is, when the target pixel is located on the lower side of the vertical center of the frame. The pieces of pixel data selected by the selectors 6811 to 6814 and 6816 to 6819 are supplied to the multipliers 6821 to 6824 and 6826 to 6829, respectively.

Figure 15:
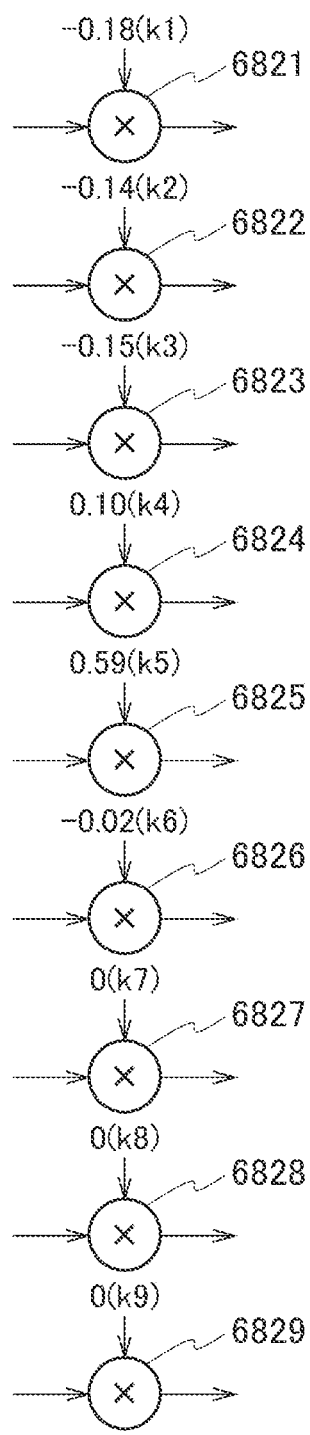
FIG. 15 is a diagram illustrating an example of coefficient values of coefficients k1 to k9 by which pixel data is multiplied by multipliers 6821 to 6829 shown in FIG. 14.

The multipliers 6821 to 6829 multiply the input pixel data by −0.18, −0.14, −0.15, 0.10, 0.59, −0.02, 0, 0, and 0 as coefficients k1 to k9, respectively and output the resulting values as shown in FIG. 15. The coefficient values of the coefficients k1 to k9 are an example, and the same coefficient values as the coefficients k1 to k9 used by the multipliers 6721 to 6729 of the horizontal filter 67 are used here. The coefficient values used by the multipliers 6821 to 6829 may be differentiated from the coefficient values used by the multipliers 6721 to 6729.

The coefficients k1 to k9 shown in FIG. 15 are coefficient values suitable for correcting pixels located on the upper side of the vertical center of the frame and are asymmetrical in the vertical direction with the target pixel as a center.

As described above, suppose that the target pixel is located on the upper side of the vertical center of the frame. In the above case, if the selectors 6811 to 6814 and 6816 to 6819 select the pixel data input to the terminal t0, the multipliers 6821 to 6829 can directly multiply 9 pixels in the vertical direction with the target pixel as the center, by the coefficients k1 to k9 of the coefficient values shown in FIG. 15.

The distortion occurring on the upper side and the distortion occurring on the lower side of the vertical center of the frame are vertically symmetrical. Therefore, the coefficient values suitable for correcting the pixels located on the lower side of the vertical center of the frame may be obtained by inverting the coefficients k1 to k9 shown in FIG.

15 vertically. As described above, suppose that the target pixel is located on the lower side of the vertical center of the frame. In the above case, if the selectors 6811 to 6814 and 6816 to 6819 select the pixel data input to the terminal t1, the multipliers 6821 to 6829 can invert the coefficients k1 to k9 shown in FIG. 15 in the vertical direction and multiply 9 pixels in the vertical direction with the target pixel as the center, by the thus obtained coefficients.

The adder 6830 adds all the multiplication results output from the multipliers 6821 to 6829 and generates a vertical high-pass filter component VHF. The high-pass filter component VHF is an AC component and has a positive or negative value. The multiplier 6831 multiplies the high-pass filter component VHF by the vertical correction value AV and generates a vertical correction component AVV. The adder 6832 adds the vertical correction component AVV to the pixel data of the target pixel output from the line memory 6805 and corrects the pixel data of the target pixel in the vertical direction.

The maximum value/minimum value detector 6810 detects the maximum value Vmax and the minimum value Vmin of the pieces of pixel data output from the line memories 6801 to 6809 and supplies the values to the selector 6833. A symbol VHFs indicating whether the high-pass filter component VHF is positive or negative is supplied to the selector 6833 and the clipper 6834. The symbol VHFs is 0 when the high-pass filter component VHF is positive and is 1 when the high-pass filter component VHF is negative. The selector 6833 selects and outputs the maximum value Vmax when the symbol VHFs is 0. Alternatively, the selector 6833 selects and outputs the minimum value Vmin when the symbol VHFs is 1.

The clipper 6834 does not operate under the following conditions: if the pixel data output from the adder 6832 is not over-corrected, and the symbol VHFs is 0 and the corrected pixel value does not exceed the maximum value Vmax, or the symbol VHFs is 1 and the corrected pixel value does not fall below the minimum value Vmin. The clipper 6834 outputs the pixel data output from the adder 6832 without any changes as correction pixel data.

As in FIG. 12, the vertical filter 68 corrects a rectangular wave signal that is blunted in the vicinity of a black portion of a boundary portion at which there is a change from a white portion to a black portion in the vertical direction. Therefore, the blurring in the vicinity of a black portion of the boundary at which there is a change from a white portion to a black portion in the vertical direction is eliminated and the boundary becomes clear. Further, the vertical filter 68 corrects a rectangular wave signal that is blunted in the vicinity of a white portion of a boundary portion at which there is a change from a black portion to a white portion in the vertical direction. Accordingly, the blurring in the vicinity of a white portion of the boundary at which there is a change from a black portion to a white portion in the vertical direction is eliminated and the boundary becomes clear.

Similar to the horizontal filter 67, if the pixel data output from the adder 6832 is over-corrected, the corrected pixel value may exceed the maximum value Vmax or fall below the minimum value Vmin, and ringing may occur.

When the symbol VHFs is 0 and the corrected pixel value exceeds the maximum value Vmax, the clipper 6834 clips the pixel data output from the adder 6832 with the maximum value Vmax supplied from the selector 6833. When the symbol VHFs is 1 and the corrected pixel value falls below the minimum value Vmin, the clipper 6834 clips the pixel data output from the adder 6832 with the minimum value Vmin supplied from the selector 6833. As a result, the clipper 6834 outputs the correction pixel data in the vertical direction which is obtained by removing the ringing added to the pixel data output from the adder 6832.

As described above, from the four vertical filters 68 shown in FIG. 6, the pieces of pixel data R(6), G1(6), G2(6), and B(6) corrected in the horizontal and vertical directions in each pixel in the frame are output.

The significance of an inversion on/off signal and the operation of an inverter 62 will now be described. In the above description, it has been described that the waveform is blunted at boundary portions at which there is a change from a white portion to a black portion in the horizontal and vertical directions, and blurring occurs at the boundaries. However, depending on the focus distance, the waveform may be blunted in the opposite direction.

Figure 16:
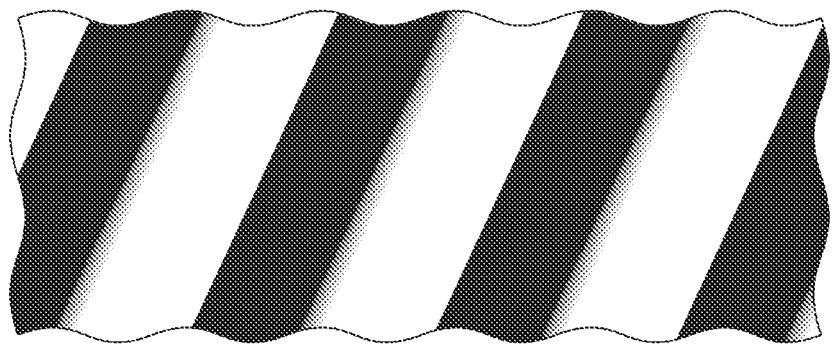
FIG. 16 is a diagram illustrating a second example of blurring occurring in an image captured by an imaging apparatus.

In the lens used in one or more embodiments, if the focus distance is 4 m or longer, the blurring occurs in the vicinity of black portions of boundaries at which there is a change from a white portion to a black portion in the horizontal and vertical directions as shown in FIG. 4. Further, the blurring occurs in the vicinity of white portions of boundaries at which there is a change from a black portion to a white portion in the horizontal and vertical directions. However, if the focus distances are 1 m and 1.5 m, in contrast to FIG. 4, the blurring occurs in the vicinity of black portions of boundaries at which there is a change from a black portion to a white portion in the horizontal and vertical directions, as shown in FIG. 16. In addition, the blurring also occurs in the vicinity of white portions of boundaries at which there is a change from a white portion to a black portion in the horizontal and vertical directions.

Figure 17:
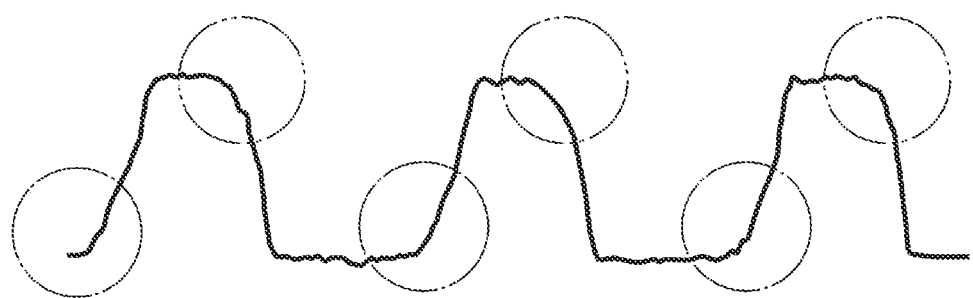
FIG. 17 is a waveform diagram illustrating a rectangular wave signal having a blunted waveform when blurring occurs in a captured image shown in FIG. 16.

As shown in FIG. 17, the waveform of a rectangular wave signal blunts to a large extent in the vicinity of black portions of boundary portions at which there is a change from a black portion to a white portion in the horizontal and vertical directions as shown by the circles of the dash-dot-dash lines. Further, the waveform of the rectangular wave signal blunts to a large extent in the vicinity of white portions of boundary portions at which there is a change from a white portion to a black portion in the horizontal and vertical directions as shown by the circles of the dash-dot-dot-dash lines.

The CPU 10 sets the focus distances of 1 m and 1.5 m as a first range and sets the focus distance of 4 m or longer as a second range. The CPU 10 outputs 0 indicating "inversion off" as an inversion on/off signal when the focus distance is in the second range. The CPU 10 outputs 1 indicating "inversion on" as an inversion on/off signal when the focus distance is in the first range. The inverter 62 of the image blunting correction circuit 6 inverts an LR value and a UD value when an inversion on/off signal is 1.

If the LR value and the UD value are inverted, coefficients k1 to k9 are inverted and used when correcting a target pixel which is located on the left side of the horizontal center of the frame or located on the upper side of the vertical center of the frame. The coefficients k1 to k9 are not inverted and are used as they are when correcting a target pixel which is located on the right side of the horizontal center of the frame or located on the lower side of the vertical center of the frame.

This enables the image blunting correction circuit 6 to correct blunting of the waveform even if the boundary at which the waveform is blunted is in the opposite direction.

Suppose that the imaging apparatus sequentially changes the focus distance as 1 m, 1.5 m, 2 m, 4 m . . . , for example. In the above case, the direction in which the rectangular wave signal is corrected is inverted between the focus distance of 1.5 m and the focus distance of 4 m. At this time, the focus distance of 2 m is the focus distance of the boundary between the first range and the second range. When the focus distance is 2 m, the adjustment coefficient Aco is set to 0, and thus the adjusted correction value ZGA is set to 0. Therefore, the rectangular wave signal is not corrected when the focus distance is 2 m. This is less likely to cause a visual sense of incongruity due to the inversion of the direction in which the rectangular wave signal is corrected.

The present invention is not limited to one or more embodiments described above, and various modifications can be made without departing from the scope of the present invention. The image blunting correction circuit 6 includes the horizontal filters 67 and the vertical filters 68, and corrects each pixel in both the horizontal and vertical directions. It is effective even if each pixel is corrected only in the horizontal direction by means of the horizontal filters 67, and therefore the vertical filters 68 may be omitted.

The correction value table 63 may be a storage unit such as a ROM that stores a plurality of discrete correction values corresponding to a plurality of image heights IH. The correction value table 63 may also be a processor that calculates and outputs correction values corresponding to the image heights IH based on a preset calculation formula.

In one or more embodiments, the coefficients k1 to k9 shown in FIG. 11 are set as coefficient values suitable for correcting pixels located on the left side of the horizontal center of the frame. Alternatively, the coefficients k1 to k9 may be set as coefficient values suitable for correcting pixels located on the right side of the horizontal center of the frame. In the above case, the coefficients k1 to k9 may be inverted when correcting pixels located on the left side of the horizontal center of the frame.

Further, in one or more embodiments, the coefficients k1 to k9 shown in FIG. 15 are set as coefficient values suitable for correcting pixels located on the upper side of the vertical center of the frame. Alternatively, the coefficients k1 to k9 may be set as coefficient values suitable for correcting pixels located on the lower side of the vertical center of the frame. In the above case, the coefficients k1 to k9 may be inverted when correcting pixels located on the upper side of the vertical center of the frame.

The left-right asymmetric coefficients k1 to k9 are used as coefficient values suitable for correcting pixels located on a first side which is one of the left and right sides of the horizontal center of the frame. If the coefficients k1 to k9 are used for correcting pixels located on a second side which is the other of the left and right sides, the coefficients k1 to k9 may be inverted horizontally. The top-bottom asymmetric coefficients k1 to k9 are used as coefficient values suitable for correcting pixels located on a third side which is one of the upper and lower sides of the vertical center of the frame. If the coefficients k1 to k9 are used for correcting pixels located on a fourth side which is the other of the upper and lower sides, the coefficients k1 to k9 may be vertically inverted.

In one or more embodiments, the image distortion caused by defocus at the ends of the frame is corrected. However, in one or more embodiments, image distortion caused by chromatic aberration or the like can also be corrected.

The present invention is not limited to the case where the functions of an image processing device (an image blunting correction circuit 6) are configured from hardware circuits. It is also possible to configure a computer program (an image processing program) for executing functions equivalent to those of the image processing device and to cause a computer (a CPU) to execute the image processing program. In this case, the CPU 10 may execute the image processing program.

What is claimed is:

1. An image processing device comprising:
a correction value table in which a correction value is set, the correction value being in accordance with a distance between a center of a frame of a captured image captured through a zoom lens, and a pixel positioned in the frame;
a first multiplier configured to multiply a correction value by an adjustment coefficient and to generate an adjusted correction value, the correction value being read from the correction value table in accordance with a distance between the center of the frame and each target pixel in the frame, and the adjustment coefficient being determined from at least a zoom magnification and a focus distance of the zoom lens;
a second multiplier configured to multiply the adjusted correction value by a cosine of an angle formed between a position of the each target pixel and the center of the frame and to generate a horizontal correction value that corrects the each target pixel in a horizontal direction; and
a horizontal filter configured to add all multiplication results obtained by multiplying a plurality of pixels in a left-right direction with the each target pixel as a center by left-right asymmetric coefficients, to generate a horizontal high-pass filter component, to add, to the each target pixel, a horizontal correction component obtained by multiplying the horizontal high-pass filter component by the horizontal correction value, and to correct the each target pixel in the horizontal direction.

2. The image processing device according to claim 1, wherein
the left-right asymmetric coefficients are set to coefficient values suitable for correcting pixels located on a first side which is one of a left side and a right side of a horizontal center of the frame,
the horizontal filter multiplies the plurality of pixels in the left-right direction with the each target pixel as the center, by the left-right asymmetric coefficients without any changes, when the target pixel is located on the first side, and
the horizontal filter inverts the left-right asymmetric coefficients horizontally and multiplies the plurality of pixels in the left-right direction with the each target pixel as the each center, by the inverted left-right asymmetric coefficients, when the target pixel is located on a second side which is the other of the left side and the right side in the horizontal direction of the frame.

3. The image processing device according to claim 1, wherein
the first multiplier multiplies the correction value read from the correction value table in accordance with the distance between the center of the frame and each target pixel in the frame, by an adjustment coefficient and generates an adjusted correction value, the adjustment coefficient being determined from the zoom magnification, the focus distance, and an iris aperture value of an iris of the zoom lens.

4. The image processing device according to claim 1, wherein
the horizontal filter includes a clipper configured to remove a ringing caused by over-correction of each target pixel.

5. The image processing device according to claim 2, wherein the horizontal filter does not invert the left-right asymmetric coefficients when a left/right differentiation value indicating whether the target pixel is located on the first side or the second side indicates that the target pixel is located on the first side, and inverts the left-right asymmetric coefficients when the left/right differentiation value indicates that the each target pixel is located on the second side, and the image processing device further comprises:

an inverter configured to invert the left/right differentiation value after receiving an instruction for inverting the left/right differentiation value in accordance with the focus distance.

6. The image processing device according to claim 5, wherein the inverter inverts the left/right differentiation value when the focus distance is in a first range and does not invert the left/right differentiation value when the focus distance is in a second range, and when the focus distance is a focus distance of a boundary between the first range and the second range, the adjustment coefficient is set to 0 in order to set the adjusted correction value to 0.

7. The image processing device according to claim 1, further comprising:

a third multiplier configured to multiply the adjusted correction value by a sine of the angle formed between the position of the each target pixel and the center of the frame and to generate a vertical correction value that corrects the each target pixel in a vertical direction; and a vertical filter configured to add all multiplication results obtained by multiplying a plurality of pixels in a top-bottom direction with the each target pixel as the center, by top-bottom asymmetric coefficients, to generate a vertical high-pass filter component, to add, to the each target pixel, a vertical correction component obtained by multiplying the vertical high-pass filter component by the vertical correction value, and to correct the each target pixel in a vertical direction.

8. An image processing method comprising:

setting a correction value in a correction value table and reading the correction value from the correction value table in accordance with a distance between a center of a frame of a captured image captured through a zoom lens and each target pixel in the frame, the correction value being in accordance with a distance between the center of the frame and a pixel positioned in the frame;

multiplying the read correction value by an adjustment coefficient and generating an adjusted correction value, the adjustment coefficient being determined from at least a zoom magnification and a focus distance of the zoom lens;

multiplying the adjusted correction value by a cosine of an angle formed between a position of the each target pixel and the center of the frame and generating a horizontal correction value that corrects the each target pixel in a horizontal direction;

adding all multiplication results obtained by multiplying a plurality of pixels in a left-right direction with the each target pixel as a center, by left-right asymmetric coefficients and generating a horizontal high-pass filter component; and adding, to the each target pixel, a horizontal correction component obtained by multiplying the horizontal high-pass filter component by the horizontal correction value and correcting the each target pixel in the horizontal direction.

* * * * *